2,652,212

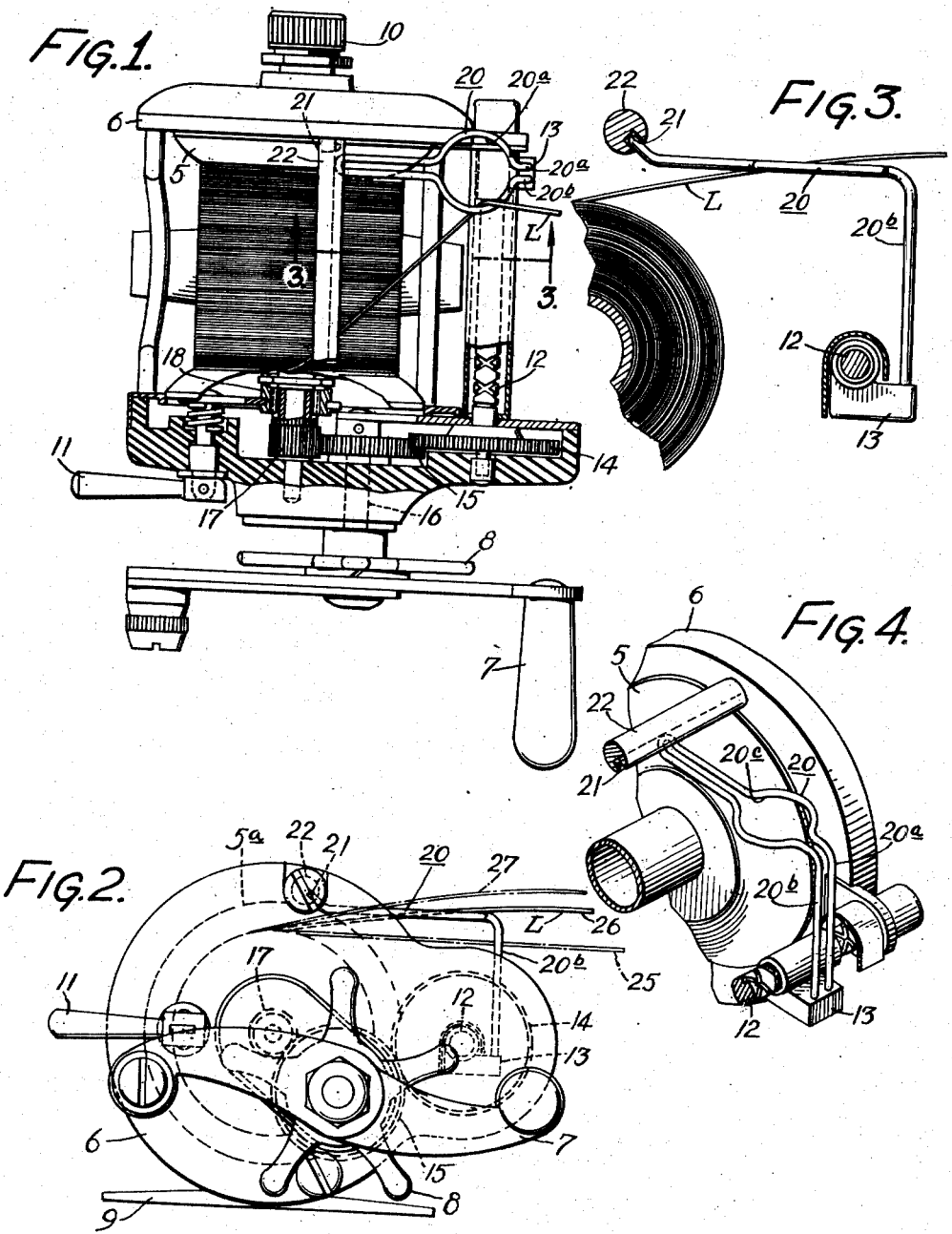
Sept. 15, 1953
J. M. HOLAHAN, JR
2,652,212
SURF CASTING FISHING REEL
Filed Jan. 28, 1952
Inventor:
Joseph M. Holahan Jr.
by his Attorneys
Howson & Howson Patented Sept. 15, 1953

UNITED STATES PATENT OFFICE 2,652,212

SURF CASTING FISHING REEL

Joseph M. Holahan, Jr., Philadelphia, Pa., assignor to Ocean City Manufacturing Company, Philadelphia, Pa., a corporation of Pennsylvania Application January 28, 1952, Serial No. 268,508

3 Claims. (Cl. 242—84.4)

This invention relates to an improved level wind for surf casting fishing reels and more particularly to the construction of the level wind hair pin for such a reel.

I am aware that the prior art shows many constructions for fishing reels in which various forms of level wind devices are used. The purpose of the level wind is, of course, to lay the line in even layers on the spool when reeling in. Naturally, there must be a driving connection between the level wind carrier and the spool so that the hair pin or line guide on the carrier travels back and forth at the proper winding rate. Devices of this sort operate in a generally satisfactory manner on fishing reels and other mechanism when reeling in. However, in a fishing reel, it is extremely important to eliminate all drag from the spool when casting. If the level wind mechanism remains connected to the spool, it is evident that a substantial drag is imparted because not only the carriage must be reciprocated back and forth at high velocity but the hair pin tends to frictionally slow down line pay-out. It has been proposed to eliminate this drag by providing means for disconnecting the level wind when casting. This has, however, introduced another disadvantage because it then becomes necessary to set the hair pin at approximately the mid-point of the spool; otherwise the drag created by the excessive angle through which the line must pay-out if the hair pin stops in an extreme position is likewise highly objectionable.

Heretofore, the above drag has not proved sufficiently great to prevent the use of level winds on fresh water bait casting reels in which the normal casting distance is on the order of 50 feet, and a ⅝ ounce sinker is used. However, for surf casting in which the normal distance may be on the order of 300 feet using a 3 or 4 ounce sinker, no satisfactory solution has been found. The problem of a suitable level wind reel for surf casting is further complicated by the frequency with which pieces of seaweed and other debris are gathered on the line. Furthermore, it must be appreciated that the peak velocity achieved in surf casting may be as high as 4 to 5 thousand feet per minute during pay-out. Also, the drag of the level wind in surf casting is subject to many extraneous factors, such as corrosion due to salt water and the presence of sand. Therefore, as noted above, no satisfactory level wind for surf casting has been developed.

The present invention contemplates particularly an improved construction for the hair pin which in conjunction with a disconnectable level wind mechanism minimizes if not completely eliminates the above disadvantages. The hair pin permits the level wind carriage to be stopped at any point in its travel, yet will not impart excessive friction to the line even when the hair pin is at one extreme position and the line pays off the spool from the opposite end. Furthermore, the construction of the hair pin permits a tangled line or one having seaweed thereon to be reeled onto the spool without the necessity for stopping the reeling operation to clean or untangle the line. This permits the fisherman to pull in a catch and then clear his line leisurely.

A primary object of the invention is to provide an improved level wind mechanism for a surf casting fishing reel.

A further object of the invention is to provide an improved hair pin construction for a surf casting fishing reel.

A still further object is to provide a level wind mechanism for a fishing reel which can be disconnected at any position and which imparts a minimum drag to line pay-out without disengaging the line from the level wind carriage.

Further objects will be apparent from the specification and drawings, in which:

Fig. 1 is a top view of the fishing reel incorporating my invention;

Fig. 2 is a side view of the structure of Fig. 1;

Fig. 3 is an enlarged fragmentary sectional detail as seen at 3—3 of Fig. 1; and, Fig. 4 is a perspective showing my improved level wind hair pin.

The invention comprises essentially the provision in a fishing reel of a gear driven level wind mechanism having means for disconnecting the level wind drive from the spool. A hair pin formed of bent wire is specially shaped to provide a pair of upright parallel arms closely spaced extending from the level wind carrier to a point approximately in line with the periphery of the spool flanges on the reel. From thence, the hair pin extends in a direction generally tangential to the spool periphery and terminates in a transverse groove which provides slidable support when the hair pin reciprocates. The spacing between the wires forming the hair pin is enlarged adjacent the right angle bend to provide an eye or loop in the wire having an inside diameter substantially greater than the spacing between the parallel portions of the hair pin.

Referring now more particularly to the drawings, my present level wind mechanism is shown incorporated on a surf casting fishing reel having the conventional spool 5, frame assembly 6, handle 7, and drag star 8. The reel is also provided with a stand 9, oil cup 10, and a disconnecting lever 11 for the level wind.

The level wind assembly is generally conventional and comprises a worm 12 which reciprocates the level wind carrier 13 when the worm is driven through meshing gears 14 and 15. Gear 14 is secured to worm 12 and gear 15 is secured to the handle shaft 16. The spool 5 is selectively operated by handle 7 through pinion gear 17 and a toggle actuated sliding clutch assembly 18. It will be understood that free spooling may be readily achieved by positioning pivoting lever 11 so that clutch 18 is disengaged.

Particular attention is directed to my improved hair pin 20 which is mounted on carrier 13. As shown in Fig. 4, the hair pin comprises a pair of parallel upright sides 20a and 20b. These sides are brought upwardly and in parallel relationship to a point substantially in line with the periphery of spool flanges 5a, 5a as shown in Fig. 2. At this point, the sides 20a and 20b are bent at substantially right angles towards the spool. Just beyond the bend, both sides curve outwardly away from each other to form a relatively large eye 20c between the sides. At the opposite end of the eye sides 20a and 20b of the hair pin converge to continue in close parallel spaced relation until they terminate in a groove 21 which is cut in the upper frame cross member 22.

It will be apparent that the hair pin 20 is formed to provide three line carrying areas; first, the substantially vertical portion adjacent carrier 13, second, the enlarged eye 20c, and third, the substantially horizontal portion adjacent cross member 22.

In operation, the fisherman winds the line L on the spool with the level wind engaged so that carrier 13 and hair pin 20 reciprocate back and forth in the usual manner. When winding in, the position of the line is substantially as shown at 25 in Fig. 2. With the line properly wound on the spool, the fisherman disconnects the level wind by means of lever 11 and it is not necessary for him to be concerned with the position of the carrier when casting. To illustrate the maximum condition, Fig. 1 shows the carrier 13 completely at one end of its travel and the line L paying off of the spool 5 from the opposite end of the spool. Even under such extreme conditions, the drag on the line is of no consequence, and the line when casting, pays-out from the spool and through the hair pin as shown at 26 and 27 of Fig. 2. The large diameter of eye 20c and the substantial spacing of the hair pin from the line on the spool reduces the angle in the line between the hair pin and the point from which the line is paying off the spool. This feature is very important for surf casting.

In the event that seaweed or other foreign matter becomes caught in the line when it is out or in the event that the line becomes tangled when reeling in, it is not necessary for the fisherman to stop and clear his line before reeling in the catch. In this event it is only necessary that the fisherman lift the line with his finger from the normal reeling in position 25 to the position 26 so that the tangle or seaweed passes through the eye 20c. This one factor has been a serious disadvantage of other reels particularly those having level wind hair pins, because in all known prior constructions, it is impossible for the fisherman to wind the line through the hair pin without clearing it first.

I have thus described an improved casting reel having a level wind mechanism which does not reduce the length of the fisherman's cast and which can be reeled in without the necessity of clearing a fouled line. It is entirely feasible to disengage the level wind and permit it to remain at rest while casting without imparting any substantial drag to the line.

Having thus described my invention, I claim:

1. In a level wind mechanism for fishing reels and the like comprising a spool, a frame in which the spool is journaled, a grooved cross member in said frame, a level wind worm journaled in said frame, a driving connection between the worm and the spool to rotatably drive the worm upon rotation of the spool, a carrier mounted on said worm and reciprocable back and forth thereon, a guide carried by said carrier to guide the fishing line on to the spool, said guide having substantially vertical upwardly extending parallel leg portions in closely spaced relationship to freely receive the line, said vertical leg portions terminating in substantially horizontal rearwardly extending closely spaced parallel leg portions having the extreme rearward end thereof slidably received in said grooved cross member, and an enlarged eye in said guide adjacent the junction of the horizontal and vertical leg portions of the guide.

2. In a level wind mechanism for fishing reels and the like comprising a spool having cylindrical end portions between which the fishing line is carried, a frame in which the spool is journaled, a grooved cross member in said frame mounted upwardly adjacent said spool end portions, a level wind worm journaled in said frame spaced forwardly of said spool end portions, a driving connection between the worm and the spool to rotatably drive the worm upon rotation of the spool, a carrier mounted on said worm and reciprocable back and forth thereon, a guide carried by said carrier to guide the fishing line on to the spool, said guide having substantially vertical upwardly extending parallel leg portions in closely spaced relationship to freely receive the line, said vertical leg portions terminating in substantially horizontal rearwardly extending closely spaced parallel leg portions having the extreme rearward end thereof slidably received in said grooved cross member, and an enlarged eye in said guide spaced from the peripheral edge of said spool end portions adjacent the junction of the horizontal and vertical leg portions of the guide.

3. In a level wind mechanism for fishing reels and the like comprising a spool having cylindrical end portions between which the fishing line is carried, a frame in which the spool is journaled, a grooved cross member in said frame mounted upwardly adjacent said spool end portions, a level wind worm journaled in said frame spaced forwardly of said spool end portions, a driving connection between the worm and the spool to rotatably drive the worm upon rotation of the spool, means for selectively disengaging said driving connection, a carrier mounted on said worm and reciprocable back and forth thereon, a guide carried by said carrier to guide the fishing line on to the spool, said guide having substantially vertical upwardly extending parallel leg portions in closely spaced relationship to freely receive the line, said vertical leg portions terminating in substantially horizontal rearwardly extending closely spaced parallel leg portions having the extreme rearward end thereof slidably received in said grooved cross member, and a horizontal enlarged eye in said guide spaced from the peripheral edge of said spool end portions in the forward edge of the horizontal leg portions of the guide and formed by substantially wider spacing between the guide leg portions.

JOSEPH M. HOLAHAN, Jr.

References Cited in the file of this patent

UNITED STATES PATENTS

| Number | Name | Date |
|---|---|---|
| 1,199,740 | Comparet | Sept. 26, 1916 |
| 1,448,786 | Breen | Mar. 20, 1923 |
| 1,448,947 | Smith | Mar. 20, 1923 |
| 1,954,713 | Powell | Apr. 10, 1934 |
| 2,160,175 | Shakespeare | May 20, 1939 |
| 2,312,576 | Nelson | Mar. 2, 1943 |
| 2,458,298 | Polevoy | Jan. 4, 1948 |